3,839,558
ANTIBIOTICS A28695A AND A28695B AND A PROCESS FOR PRODUCTION THEREOF
Robert L. Hamill, New Ross, and Marvin M. Hoehn, Indianapolis, Ind., assignors to Eli Lilly and Company, Indianapolis, Ind.
Filed Dec. 23, 1971, Ser. No. 211,231
Int. Cl. A61k 21/00
U.S. Cl. 424—121                    3 Claims

ABSTRACT OF THE DISCLOSURE

Antibiotics A28695A and A28695B produced by culturing Streptomyces albus strain NRRL 3883 under submerged aerobic fermentation conditions in nutrient culture media, are isolated as an antibiotic mixture by extraction of fermentation broth and mycelium and are separated by silica gel chromatography. Antibiotics and mixtures thereof have anticoccidial and antimicrobial activity.

BACKGROUND OF THE INVENTION

Coccidiosis is a widespread poultry disease involving the invasion of cecal and intestinal mucosa by coccidia, specifically protozoan parasites of the genus Eimeria. When untreated, the severe form of the disease leads to poor weight gain, reduced feed efficiency, reduced egg production and high mortality. For these reasons the control of coccidiosis is highly important to the poultry industry.

Although a number of antibiotics have been developed, some of which possess activity against coccidia, there remains a need for more effective and economically useful agents for the treatment of coccidiosis.

SUMMARY OF THE INVENTION

Antibiotics A28695A and A28695B are produced as an antibiotic mixture by culturing the organism Streptomyces albus NRRL 3883 under submerged aerobic fermentation conditions. The antibiotics are recovered from the fermentation medium by extraction in the form of their mixed sodium potassium salts and as such are purified and isolated from the antibiotic mixture and obtained as individual antibiotics in crystalline form by chromatography over silica gel. The antibiotics are acidic substances which form salts such as the sodium, potassium and ammonium salts with appropriate bases.

The A28695 antibiotic mixture and the individual antibiotics possess significant activity against coccidia and are useful in the treatment of coccidiosis.

DETAILED DESCRIPTION

This invention relates to novel antibiotics and to a method for their production. In particular, it relates to certain acidic, non-nitrogenous antibiotics and to the alkali metal, alkaline earth metal, and ammonium salts thereof.

The antibiotics described herein are arbitrarily designated A28695A and A28695B. They are produced along with other unidentified antibiotic substances by culturing the micro-organism Streptomyces albus NRRL 3883 in an aqueous, nutrient culture medium under submerged aerobic fermentation conditions until a substantial level of antibiotic activity is produced. Antibiotic factor A28695A is produced in greater abundance than is antibiotic A28695B. The other antibiotic substances produced in the fermentation occur in such minor amounts as to render their recovery unrewarding.

Antibiotic A28695A as isolated from the A28695 mixture of antibiotics is obtained as a white, crystalline mixed sodium-potassium salt having a melting point of 161°–165° C.

The mixed sodium-potassium of antibiotic A28695A is insoluble in water, slightly soluble in methanol, soluble in ether, and soluble in esters such as methyl acetate, ethyl acetate and the like; ketones such as acetone and methyl ethyl ketone; the halogenated hydrocarbons such as chloroform; and the aromatic hydrocarbons such as benzene and toluene. Antibiotic A28695A is stable in solution at pH values above pH 4.0 at temperatures up to 27° C. The specific optical rotation, $[\alpha]_D^{25}$, of the mixed sodium-posassium salt of antibiotic A28695 is +14.07° (C=1, methanol).

Figure 1:
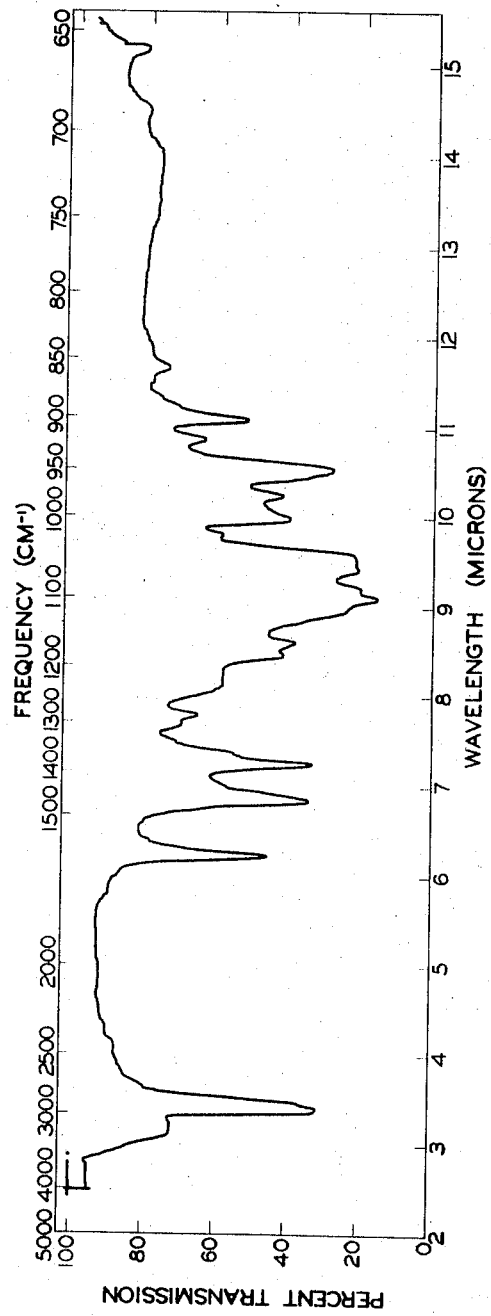

The infrared absorption spectrum of antibiotic A28695A as the mixed sodium-potassium salt in chloroform solution is shown in FIG. 1 of the accompanying drawings. The following distinguishable absorption maxima in the spectrum are observable over the range of 2.0 to 15.0 microns: 3.1–3.3, 3.4, 3.47, 6.24, 6.84, 7.00, 7.25, 7.37, 7.49, 7.68, 7.78, 8.1, 8.47, 8.61, 8.95, 9.11, 9.20, 9.42, 9.5, 9.80, 9.98, 10.24, 10.54, 10.87, 11.09, 11.5, and 11.66 microns. The antibiotic has no characteristic ultraviolet absorption pattern.

A powder X-ray diffraction pattern of the crystalline mixed sodium potassium salt of antibiotic A28695A using vanadium filtered chromium radiation and a wave length value of 2.2896 A. for calculating the interplanar spacings gives the following values:

| d | $I/I_1$ | d | $I/I_1$ |
|---|---|---|---|
| 18.23 | 1.00 | 5.92 | 0.30 |
| 14.75 | 1.00 | 5.59 | 0.10 |
| 13.26 | 0.40 | 5.43 | 0.40 |
| 12.05 | 0.60 | 5.24 | 0.10 |
| 9.53 | 0.40 | 5.09 | 0.20 |
| 9.01 | 0.50 | 4.94 | 0.40 |
| 8.27 | 0.30 | 4.76 | 0.05 |
| 8.02 | 0.30 | 4.57 | 0.10 |
| 7.61 | 0.30 | 4.35 | 0.05 |
| 7.36 | 0.50 | 4.16 | 0.02 |
| 6.93 | 0.02 | 4.09 | 0.10 |
| 6.69 | 0.60 | 3.98 | 0.05 |
| 6.02 | 0.40 | | |

The free acid of A28695A is a white crystalline solid melting at about 97°–99° C. Elemental analysis of the free acid form of antibiotic A28695A gives the following elemental composition: 63.31 percent carbon; 8.83 percent hydrogen and 28.03 percent oxygen. Mass spectral data on antibiotic A28695A indicates an approximate molecular weight of 834. Electrometric titration of the sodium salt of antibiotic A28695A in 66 percent aqueous ethanol shows the presence of one titratable group which has a pKa value of 5.51. The molecular weight of the sodium salt, as determined from the titration data, is approximately 874. The molecular weight of the free acid would therefore be approximately 852. This value is higher than the value from the mass spectral data. The value calculated from the mass spectral data is probably the more accurate, because of the limitations of the titration method. Nuclear magnetic resonance spectral data indicates the presence of four methoxy groups in antibiotic A28695A.

The mixed sodium-potassium salt of antibiotic A28695B is a white, crystalline compound melting at 170°–172° C. The solubility and stability pattern of the antibiotic is similar to that of the mixed sodium-potassium salt of antibiotic A28695A.

Figure 2:
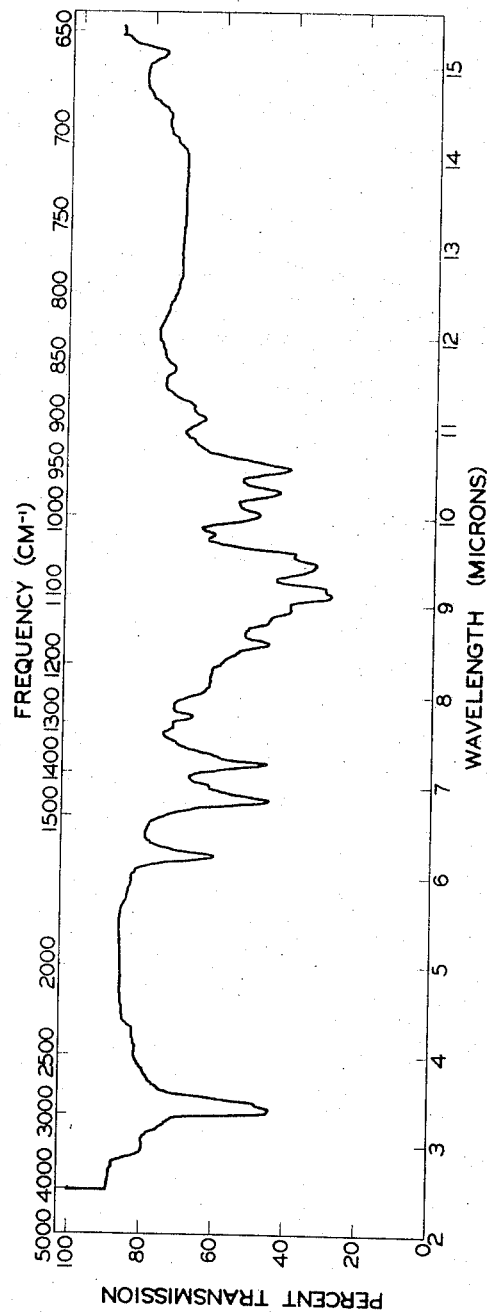

The infrared absorption spectrum of A28695B as the mixed sodium-potassium salt in chloroform solution is shown in FIG. 2 of the accompanying drawings. The distinguishable bands in the infrared spectrum over the range of 2.0 to 15.0 microns are as follows: 3.0, 3.4, 3.47, 6.24, 6.85, 7.01, 7.26, 7.3, 7.68, 7.78, 8.1, 8.58, 8.82, 8.95, 9.11, 9.19, 9.45, 9.59, 9.82, 10.04, 10.28, 10.55, 11.10, 11.24 and 11.65 microns.

The antibiotic has no characteristic ultraviolet absorption pattern.

The optical rotation, $[\alpha]_D^{25}$, of the mixed sodium-potassium salt of antibiotic A28695B is +10.1° (C=1, methanol).

The acid form of antibiotic A28695B is a white crystalline solid with a melting point of 122–124° C. Microanalysis gives the following percent elemental composition of the acid form A28695B: 60.49 percent carbon; 9.15 percent hydrogen and 31.32 percent oxygen. Nuclear magnetic resonance spectral data indicates that antibiotic A28695B contains three methoxy groups. Mass spectral data on antibiotic A28695B indicates an approximate molecular weight of 846. Electrometric titration of antibiotic A28695B as the sodium salt in 66 percent aqueous ethanol shows the presence of one titratable group having a pKa value of 5.9. The molecular weight of the sodium salt of antibiotic A28695B, calculated from the titration data, is approximately 877. The molecular weight of the free acid of antibiotic A28695B would therefore be approximately 855.

A powder X-ray diffraction pattern of the crystalline antibiotic A28695B acid using vanadium filtered chromium radiation and a wave length value of 2.2895 A. for calculating interplanar spacings gives the following values:

| d | I/I$_1$ | d | I/I$_1$ |
|---|---|---|---|
| 13.54 | .50 | 3.98 | .10 |
| 12.63 | .05 | 3.84 | .60 |
| 11.52 | .15 | 3.73 | .05 |
| 9.96 | .02 | 3.66 | .05 |
| 9.39 | .60 | 3.57 | .05 |
| 7.88 | .20 | 3.48 | .05 |
| 7.52 | .20 | 3.22 | .15 |
| 7.08 | .30 | 3.07 | .10 |
| 6.66 | 1.00 | 3.05 | .02 |
| 6.46 | .20 | 2.94 | .02 |
| 6.28 | .20 | 2.84 | .02 |
| 6.05 | .30 | 2.72 | .10 |
| 5.81 | .50 | 2.56 | .02 |
| 5.57 | .20 | 2.33 | .02 |
| 5.33 | .70 | 2.27 | .02 |
| 4.92 | .60 | 2.15 | .05 |
| 4.63 | .60 | 2.09 | .02 |
| 4.51 | .20 | 2.07 | .02 |
| 4.29 | .30 | 2.03 | .02 |
| 4.14 | .30 | | |

The paper chromatographic behavior of the mixed sodium and potassium salts of A28695A and B is shown by the R$_f$ values in Table I below. The values were obtained in the indicated solvent systems, using in each instance Whatman No. 1 paper. The location of the antibiotics on the chromatogram was determined by bioautograph using *Bacillus subtilis* as the detecting organism.

TABLE I

Paper chromatography of antibiotics A28695A and A28695B

| Solvent system | Rf value* | |
|---|---|---|
| | A28695A | A28695B |
| Water saturated with butanol | 0.53 | 0.83 |
| Water saturated with butanol; 2% p-toluene sulfonic acid; 1% piperidine | 0.64 | 0.76 |
| Water saturated with methyl isobutylketone; 2% p-toluene sulfonic acid; 1% piperidine | 0.58 | 0.74 |
| Water:methanol:acetone (12:3:1)** | 0.25 | 0.54 |
| Benzene saturated with water | 0.57 | 0.48 |

*Rf value is defined as the ratio of the distance traveled by the antibiotic from the origin to the distance traveled by the solvent front from the origin.
**This solution is adjusted to pH 10.5 with NH$_4$OH and then the pH is lowered to pH 7.5 with H$_3$PO$_4$.

Thin layer chromatography on silica gel plates with a vanillin spray as a detecting agent is also used to identify and separate antibiotic A28695A and B. The chromatographic behavior on silica gel is shown below.

TABLE II

Thin layer chromatography of antibiotics A28695A and A28695B

| Solvent system | Rf value | |
|---|---|---|
| | A28695A | A28695B |
| Benzene:ethyl acetate (1:1) | 0.71 | 0.61 |
| Chloroform:ethyl acetate (2:3) | 0.69 | 0.61 |
| Benzene:acetone (9:1) | 0.29 | 0.20 |

The novel antibiotics of this invention have an inhibitory action against the growth of microbial organisms, both bacteria and fungi, which are pathogenic to animal and plant life and are therefore useful in suppressing the growth of such organisms. The minimum inhibitory concentrations of the mixed sodium and potassium salts of both antibiotics A28695A and A28695B as determined by the agar dilution test with illustrative organisms are listed in Table III.

TABLE III

Microbiological Activity of Antibiotics A28695A and A28695B

| Test organism | Minimum inhibitory concentration (mcg./ml.) | |
|---|---|---|
| | A28695A | A28695B |
| *Staphylococcus aureus* | <1.56 | 6.25 |
| *Streptococcus faecalis* | <1.56 | 12.50 |
| *Botrytis cinerea* | 25.00 | 25.00 |

When tested in a disc plate test, both antibiotics, A28695A and A28695B, show discernible zones of inhibition against the microorganisms *Bacillus subtilis*, *Mycobacterium avium*, and *Sarcina lutea*.

The antibiotic A28695B, when tested in a virus-tissue culture system, shows activity against the following viruses: vaccinia virus, poliovirus III, Semliki Forest virus, herpes virus and influenza virus Japan 305.

The antibiotics of this invention, when tested in plants, will prevent the development of certain plant diseases. A preparation of a mixture of the antibiotics A28695A and B, when applied as a spray is active against powdery mildew disease in bean plants and crown gall disease of tomato plants. A mixture of antibiotics A28695A and B is also active against the plant virus diseases, Southern bean mosaic virus and maize dwarf virus, when applied to infected plants as a spray or drench.

In addition to the foregoing activities, the A28695 antibiotics also have insecticidal activity. For example, the kill rate of houseflies in contact with a solution of antibiotic A28695A or antibiotic A28695B at a concentration of 100 p.p.m. is 88 percent. At a concentration of 250 p.p.m., the kill rate is 99%.

Still another important property of the A28695 antibiotics is their ability to prevent the development of coccidiosis in poultry. The results observed when each antibiotic is added to the feed of chickens infected with a combined infection of *Eimeria tenella*, *Eimeria necatrix*, *Eimeria maxima*, *Eimeria acervulina* are shown in the following table.

TABLE IV

Activity of A28695 antibiotics against coccidiosis in chickens

| Test group | Level in feed, percent by weight | Percent | | | |
|---|---|---|---|---|---|
| | | Mortality | Weight gain* | Reduction in lesion scores** | |
| | | | | Intestinal | Cecal |
| A28695A | 0.01 | 0 | 76 | 100 | 100 |
| | 0.005 | 0 | 100 | 100 | 66 |
| | 0.0025 | 0 | 80 | 90 | <40 |
| A28695B | 0.02 | 0 | 90 | 100 | 96 |
| Infected controls | | 15 | 36 | 0 | 0 |
| Normal controls | | 0 | 100 | | |

*Normal controls taken as 100%.
**Compared with infected controls.

The results observed with chickens infected with *E. tenella* are shown in Table V.

TABLE V

Efficacy of antibiotics A28695A and A28695B against *Eimeria tenella* in chickens

| Test group | Level in feed, percent by weight | Percent | | |
| --- | --- | --- | --- | --- |
| | | Mortality | Weight gain* | Reduction in lesion scores** |
| A28695A | .005 | 0 | 100 | 90 |
| | .0025 | 0 | 100 | 33 |
| | .00125 | 0 | 80 | 0 |
| A28695B | .03 | 0 | 93 | 100 |
| | .02 | 0 | 100 | 100 |
| Infected controls | | 20 | 72 | 0 |
| Normal controls | | 0 | 100 | |

*Normal controls taken as 100%.
**Compared with infected controls.

The acute toxicity of antibiotic A28695A in mice, expressed as $LD_{50}$, is about 41.1 mg./kg. of body weight when the antibiotic is administered orally. The $LD_{50}$ of antibiotic A28695B when administered orally to mice is about 43.5 mg./kg. body weight.

The individual A28695 antibiotics and mixtures thereof enhance carbohydrate utilization in ruminants and thereby provide improved feed efficiency in such animals. As demonstrated by in vitro tests carried out with rumen fluid, the antibiotics effect the volatile free fatty acid composition in the rumen. In particular the antibiotics increase the amount of propionate available for metabolism in ruminants. Propionate is utilized more efficiently than acetate which is present in greater abundance in untreated animals.

The relative efficiency of utilization of the VFA's is discussed by McCullough, *Feedstuffs*, June 19, 1971, page 19; Eskeland et al., *J. An. Sci. 33*, 282 (1971); and Church et al., *Digestive Physiology and Nutrition of Ruminants*, vol. 2 (1971), pages 622 and 625.

Another characteristic property of the A28695 antibiotics is their ability to form complexes with monovalent cations. In experiments to determine ion specificity, antibiotic A28695A showed specificity for potassium ions and rubidium ions, while antibiotic A28695B showed specificity for sodium and potassium ions. The use of ion-specific electrodes is important in many chemical analyses. Because of their unique properties, antibiotics A28695A and B are suitable as components of ion-specific electrodes.

The complexes formed by the A28695 antibiotics with monovalent cations are lipid soluble and will therefore, facilitate the transport of ions across membranes. Antibiotics which show these properties are generally termed ionophores.

The effects of the A28695 antibiotics on ion-transport can be measured in a system using rat liver mitochondria and the antibiotic valinomycin. Both antibiotic A28695A and A28695B reverse the stimulatory effect of valinomycin on the hydrolysis of adenosine triphosphate in rat liver mitochondria.

The novel antibiotics of this invention are produced by culturing a newly discovered strain of an actinomycete organism under submerged aerobic conditions in a nutrient culture medium until the culture medium contains substantial antibiotic activity. The antibiotics can be recovered from the fermentation medium by employing various isolation and purification procedures known in the art.

The actinomycete used in the production of the antibiotics of this invention has been identified as a strain of *Streptomyces albus* (Rossi-Doria) Waksman and Henrici. The organism has been deposited without restriction as to availability with the permanent culture collection of the Northern Utilization Research and Development Division, Agricultural Research Service, United States Department of Agriculture, Peoria, Illinois. Its accession number in this collection is NRRL 3883. The strain was isolated from a soil sample collected in Curacao (Dutch Antilles). Portions of the soil sample were suspended in sterile deionized water and the suspensions were streaked on nutrient agar in Petri plates. After incubation at 25°–35° C. until growth was attained, colonies of the antibiotic A28695-producing organisms were transferred to agar slants with a sterile platinum loop. The agar slants were then incubated to provide a suitable inoculum for the production of A28695.

The methods employed in the taxonomic studies of the A28695-producing culture, NRRL 3883, were those recommended for the International Streptomyces Project [Shirling and Gottlieb, *Intern. Bull. Systematic Bacteriol., 16*:313–340 (1966)], together with certain supplementary tests. Results of the taxonomic studies are summarized in the paragraphs which follow. Color names were assigned according to the Inter-Society Color Council—National Bureau of Standards (ISCC—NBS) method (Kelly and Judd, *The ISCC—NBS Method of Designating Colors and a Dictionary of Color Names*, U.S. Dept. of Commerce Circ. 553, Washington, D.C. 1955). Letters in parentheses refer to color blocks and underlined letters and numbers to color tabs in the Tresner and Backus color series [*Appl. Microbiol. 11*:335–338 (1963)]. The Maerz and Paul color block designations, [*Dictionary of Color*, McGraw-Hill Book Co., Inc., New York (1950)], are enclosed in brackets. ISP numbers refer to International Streptomyces Project media, Shirling and Gottlieb, (available from Difco Laboratories, Detroit, Mich). Observations were made following incubation at 30° C. for fourteen days unless otherwise noted.

Microscopic Morphology, Cultural Characteristics, and Physiology

| | |
| --- | --- |
| Microscopic morphology | Sporophores are spiralled. Spores are oval (1.0–1.25µ x 0.5–1.0µ) and occur in chains of 10 to 50. |
| Cultural characteristics: | |
| ISP medium #2 | Abundant growth; reverse light yellow brown [11E5]. Good aerial mycelium and sporulation, white (W)a. No soluable pigment. |
| ISP medium #3 | Fair growth; reverse white. Fair aerial mycelium and sporulation white (W)a, with scattered areas of light yellow, (Y) 1½fb. |
| ISP medium #4 | Abundant growth; reverse pale yellow [10F3]. Abundant aerial mycelium and sporulation, white (W)a. Light brown soluble pigment. |
| ISP medium #5 | Good to abundant growth; reverse light yellow [10J2]. Good to abundant aerial mycelium and spores, pale yellow (Y)2ba. No soluble pigment. |
| Calcium malate | Good growth; reverse light yellow [10F3]. Moderate aerial mycelium and sporulation, pale yellow (Y)1ba. None to slight yellow soluble pigment. |
| Czapek's medium | Good growth; reverse light yellow [9J2]. Good aerial mycelium and sporulation, pale yellow (Y)2ba. No soluble pigment. |
| Tomato paste oatmeal | Abundant growth; reverse pale yellow [10–B2]. Good aerial mycelium and sporulation, yellowish gray (G)2dc. No soluble pigment. |
| Physiology: | |
| Temperature requirements | Good growth and sporulation at 26°–37° C. No growth at 43° C., 49° C., or 55° C. |
| Skim milk | No curd or clearing after 21 days. Surface ring of growth; sediment. |
| Gelatin | Complete liquefaction after 21 days. |
| Nitrate reduction | Slight reduction after 21 days. |

Table VI summarizes the results of the carbon utilization tests carried out on the A28695-producing culture, NRRL 3883. Symbols employed in the table are as follows:

+ = positive utilization
(+) = probably utilization
(−) = questionable utilization
− = no utilization

TABLE VI

Carbon Utilization of NRRL 3883

| Substrate | Response |
| --- | --- |
| Inositol | (+) |
| Mannitol | + |
| Cellulose | (−) |
| Cellobiose | + |
| Fructose | + |
| Arabinose | + |
| Rhamnose | + |
| Raffinose | + |
| Xylose | + |
| Dextrose | (+) |

The A28695-producing culture (NRRL 3883) appears to be very similar to the strain of *Streptomyces albus* ATCC 3004 as described by Lyons and Pridham, *J. Bacteriol.*, 83:370–380 (1962). Variations occur in the utilization of four carbon sources and in growth above 37° C. The NRRL 3883 culture employed in this invention is also similar to NRRL 3384, which produces antibiotic A204 [Belgian Pat. No. 728,382 (Aug. 13, 1969)]; observed differences indicate that NRRL 3384 produces slightly longer spores, does not liquefy gelatin, and grows at somewhat higher temperatures.

The culture medium employable in producing antibiotics A28695A and B by cultivation of the above-described organism can be any one of several media, since, as is apparent from the above-described utilization tests, the organism is capable of utilizing different energy sources. However, for economy of production, maximum yield of antibiotic, and ease of isolation of the antibiotic, certain culture media containing relatively simple nutrient sources are preferable. For example, the media useful in the production of antibiotics A28695A and B include an assimilable source of carbon such as glucose, mannitol, fructose, soluble starch, dextrin, molasses, brown sugar and the like. Preferred sources of carbon are glucose and dextrin. Additionally, employable media include a source of assimilable nitrogen such as oatmeal, beef extract, hydrolyzed casein, corn steep liquor, yeast extract, soybean meal, peptones (meat or soy) and the like. Preferred sources of nitrogen are soybean meal and acid-hydrolyzed casein.

Mineral salts, for example those providing calcium, magnesium, sodium, potassium, cobalt, chloride, sulfate and carbonate ions, and a source of growth factors, such as yeast or yeast extract, can be incorporated into the media with beneficial results.

As with many microorganisms, it is believed to be desirable to include the so-called "trace elements" in the culture medium for growing the actinomycete employed in this invention. Such trace elements are commonly supplied as impurities incidental to the addition of the other constituents of the medium.

Production of the compound of the invention can be effected at any temperature conducive to satisfactory growth of the microorganism, for example, between about 26° C. and 40° C. and preferably between about 26°–30° C. Ordinarily, optimum production of the antibiotics is obtained in about two to five days.

The initial pH of the culture medium can be varied widely. However, it has been found desirable that the initial pH of the medium be between 6.5 and 7.2. As has been observed with other actinomycetes, the pH of the medium gradually increases throughout the growth period of the organism and may attain a level from about 7.0 to about 8.0 or above, the final pH being dependent at least in part of the initial pH of the medium, the buffers present in the medium, and the period of time the organism is permitted to grow. Small quantities of the antibiotic are obtained conveniently by shape flasks and surface culture in bottles. For the production of substantial amounts of antibiotic A28695, however, submerged aerobic culture in large tanks is preferably employed.

In order to avoid a pronounced lag in the production of the antibiotic with the attendent inefficient utilization of equipment, it is preferred to use the vegetative rather than the spore form of the organism for inoculation of the medium in the production tanks. Accordingly, a vegetative inoculum of the organism is first prepared by inoculating a relatively small quantity of the culture medium with the spore form of the organism, and the young active vegetative inoculum so obtained is then transferred aseptically to the large production tanks. The medium in which the vegetative inoculum is produced can be the same as that utilized for the production of the antibiotic, although other media can be employed advantageously.

As is customary in submerged aerobic culture processes, sterile air is blown through the culture medium. For efficient growth of the organism and antibiotic production, the volume of air employed in the tank production of antibiotics A28695A and A28695B is preferably upwards of 0.1 volume of air per minute per volume of culture medium. Efficient growth and optimal yields of antibiotics A28695A and A28695B are obtained when the volume of air used is at least three-tenths volume of air per minute per volume of culture medium.

The concentration of antibiotic activity in the culture medium can be followed readily during the fermentation period by testing samples of the culture medium for their inhibitory activity against the growth of an organism known to be inhibited in the presence of antiobiotics A28695A and A28695B. The use of the organism *Bacillus subtilis* has been found to be suitable for this purpose. The testing can be carried out by well-known turbidometric or disc plate assay methods.

A variety of procedures can be used in the isolation and purification of antibiotics A28695A and A28695B, for example, solvent extraction, use of adsorbents and chromatography columns. Solvent extraction procedures are preferred for commercial production inasmuch as they are less time consuming and less expensive, and higher recovery yields are obtained thereby.

The antibiotic activity is located in the mycelium as well as in the fermentation beer. The mycelium can be separated from the fermentation beer by filtration with the use of a filter aid and both the mycelial cake and the filtered fermentation medium extracted with a suitable organic solvent to recover the A28695 activity. Alternatively, the unfiltered fermentation beer can be extracted with an organic solvent to recover the antibiotic activity. Suitable extraction solvents include, for example, ethyl acetate, amyl acetate, ethanol or methanol. The antibiotic extrates are evaporated under reduced pressure to obtain an impure mixture of the A28695 antibiotics as an oily residue. The antibiotics thus recovered are present in the form of their mixed sodium-potassium salts. Further purification of the antibiotic mixture can be accomplished by chromatography of the oily residue over a suitable adsorbent such as activated carbon or silica gel. An activated carbon adsorbent such as Pittsburgh Carbon is a preferred adsorbent for purifying the A28695 antibiotic mixture.

The individual antibiotics can be separated from the mixture by further chromatography. Thus, for example, the mixture of the sodium-potassium salts of A28695A and B can be dissolved in a solvent system consisting of benzene:ethyl acetate (9:1) and the solution so obtained chromatographed on a column packed with silica gel. The column is then eluted with the same solvent mixture and multiple fractions are collected. The progress of the fractionation is monitored by examining the individual fractions on thin layer chromatograms or paper chromatograms. The fractions containing each individual antibiotic are combined and the solvent is removed by evaporation to yield in substantially pure form the separated antibiotics in the form of their mixed sodium-potassium salts.

This invention is further illustrated by the following examples, but is not intended to be limited thereby.

EXAMPLE 1

A. Shake-flask fermentation of A28695

The A28695-producing culture is prepared and maintained on an agar slant having the following composition:

| | | |
|---|---|---|
| Dextrin 700 [1] | g | 10.0 |
| N-Z amine A [2] | g | 2.0 |
| Beef extract | g | 1.0 |
| Yeast extract | g | 1.0 |
| Agar | g | 20.0 |
| Deionized water | l | 1 |

[1] Potato dextrin imported from Holland.
[2] Sheffield Chemical Co., Division of National Dairy Products Corp., Norwich, N.Y.

The slant is inoculated with the A28695-producing culture, NRRL 3883, and incubated at 30° C. for 4–6 days. The sporulated slant is covered with a small amount of sterile deionized water and gently scraped to provide an aqueous spore suspension.

One milliliter of the resulting spore suspension is used to inoculate 100 ml. of sterile vegetative medium having the following composition:

| | | |
|---|---|---|
| Glucose | g | 15.0 |
| Soybean meal | g | 15.0 |
| Corn steep solids | g | 5.0 |
| $CaCO_3$ | g | 2.0 |
| NaCl | g | 5.0 |
| Tap water | l | 1 |

The inoculated vegetative medium is incubated for 24–48 hours at 30° C. on a reciprocal shaker having a two-inch stroke operating at 108 strokes per minute or on a rotary shaker operating at 250 r.p.m. A 5 ml. portion of the resulting culture is then employed to inoculate 100 ml. of sterilized production medium contained in a 500 ml. Erlenmeyer flask and having the following composition:

| | | |
|---|---|---|
| Soybean meal | g | 15.0 |
| Casein | g | 1.0 |
| $NaNO_3$ | g | 3.0 |
| Glucose syrup | g | 20.0 |
| Tap water | l | 1 |

The inoculated medium is allowed to ferment for 42–72 hours at 25°–30° C. on either a rotary shaker operating at 250 r.p.m. or on a reciprocal shaker operating at 108 strokes per minute. The observed terminal pH is between about 6.5 to 8.0.

B. Tank fermentation of A28695

The A28695-producing culture is prepared and maintained on an agar slant having the following composition:

| | | |
|---|---|---|
| Dextrin | g | 10.0 |
| Yeast extract | g | 1.0 |
| Enzyme-hydrolyzed casein | g | 2.0 |
| Beef extract | g | 1.0 |
| $CoCl_2 \cdot 6H_2O$ | g | 0.01 |
| Agar | g | 20.0 |
| Deionized water | l | 1 |

The pH of the medium is adjusted to 7.0 with sodium hydroxide solution. After steam sterilization, by autoclaving at 15–20 pounds pressure for thirty minutes, the pH of the medium is pH 6.9.

The slant is inoculated with the A28695-producing culture, NRRL 3883, and incubated at 30° C. for 10 days. The sporulated slant is covered with a small amount of sterile deionized water and gently scraped to provide an aqueous spore suspension.

Each slant is used to inoculate six 250 ml. flasks containing 50 ml. of sterile vegetative culture medium having the following composition:

| | | |
|---|---|---|
| Glucose | g | 15.0 |
| Soybean grits | g | 15.0 |
| Corn steep liquor | g | 10.0 |
| NaCl | g | 5.0 |
| $CaCO_3$ | g | 2.0 |
| Tap water | l | 1.1 |

The pH of the medium is adjusted to 6.5 with sodium hydroxide solution and is unchanged by sterilization by autoclaving at 15–20 pounds pressure for 30 minutes.

The inoculated medium is allowed to ferment for 72 hours at 30° C. on a rotary shaker operating at 250 r.p.m. A 10 ml. portion of the resulting culture is used to inoculate 200 ml. of sterilized second-stage growth medium contained in a liter flask and having the same composition described above.

The inoculated medium is allowed to ferment for 30 hours at 30° C. on a reciprocal shaker operating at 250 r.p.m. A 200 ml. portion of the resulting culture is used to inoculate 25 liters of the following medium in a 40-liter fermentor:

| Ingredient: | Percent |
|---|---|
| Glucose | 2.5 |
| Soybean grits | 1.5 |
| Acid-hydrolyzed casein | 0.1 |
| Molasses | 0.3 |
| $CaCO_3$ | 0.25 |
| Tap water, liters | 25 |

The pH of the medium is 7.2 after sterilization by autoclaving at 15–20 pounds pressure for 30 minutes.

The inoculated medium is aerated at a rate of three-tenths volume of air per volume of culture per minute and is stirred with conventional agitators at 350 r.p.m. The fermentation is carried out at 30° C. for 5 days.

C. Isolation of Antibiotic Mixture

Ninety-two liters of whole fermentation broth obtained from an A28695 fermentation was filtered with the aid of a commercial filter aid. The mycelial cake was suspended in 25 liters of methanol, and the mixture was stirred vigorously for 30–60 minutes. The mixture was then filtered, and the filtrate was concentrated to remove the methanol. The aqueous phase so obtained was combined with the filtrate from the original fermentation broth.

The extracted mycelial cake was then suspended in 25 liters of ethyl acetate and the suspension was stirred 30–60 minutes. The mixture was then filtered, and the mycelial cake was discarded. The ethyl acetate extract was saved to combine with the ethyl acetate extracts of the filtered broth. The filtered broth was then extracted twice with half volumes of ethyl acetate. The spent broth was discarded. The ethyl acetate extracts were combined with the ethyl acetate extract of the mycelial cake.

Alternatively, the A28695 activity was extracted from the unfiltered fermentation medium by the following procedure: Ninety-two liters of the whole fermentation medium was stirred with an equal volume of ethyl acetate. The mixture was filtered and the resulting filtrate was separated into the ethyl acetate phase and the aqueous phase. The aqueous phase was discarded, and the ethyl acetate phase was saved to be combined with a second extract.

The extracted mycelial mass was then extracted a second time with ethyl acetate. The mycelial mass was discarded. The ethyl acetate extract was combined with the original extract.

The pooled extracts, obtained by extraction of either whole fermentation medium or of the broth and mycelium separately, were concentrated to an oily residue. The resulting oil was dissolved in one liter of chloroform. The chloroform solution was passed over a 5.5 cm. x 100 cm. column of Pittsburgh carbon (12 x 40 mesh) packed in chloroform. The column was washed with 20 liters of chloroform. The chloroform effluent and wash were combined and concentrated to a dry residue. Seventy and four-tenths grams of A28695 activity was recovered.

D. Separation of Antibiotics A28695A and A28695B

Thirty grams of crude antibiotic mixture A28695 obtained according to the procedure described in the previous section was dissolved in a 9:1 mixture of benzene and ethyl acetate. The solution was passed over a 5.5 cm. x 115 cm. column of silica gel (Grace grade number 62, Davison Chemical, Baltimore, Maryland 21226). The adsorbent had previously been washed with benzene:ethyl acetate (9:1). The column was washed with six liters of benzene:ethyl acetate (9:1) and the effluent and wash were discarded. The column was then eluted with a benzene:ethyl acetate solution (4:1). The eluate was collected in multiple fractions, antibiotic A28695A coming off the column in the early fractions, while antibiotic A28695B was collected in subsequent fractions. The identity of the antibiotic in the respective column fractions was determined by paper chromatography and thin layer chromatography. The column fractions containing the same antibiotic were combined and evaporated *in vacuo* to yield the respective individual antibiotics in substantially pure form.

Antibiotic A28695A was crystallized by dissolving the amorphous antibiotic in warm ether. The antibiotic crystallized as the mixed sodium-potassium salt with a melting point of about 163°–165° C. Yield: 11.8 grams.

Antibiotic A28695B was also crystallized from ether in the form of the mixed sodium-potassium salt with a melting point of 152°–154° C. Yield: 5.3 grams.

EXAMPLE 2

Preparation of Acid Form of Antibiotic A28695A

Five grams of the mixed sodium and potassium salt of antibiotic A28695A were dissolved in 105 ml. of dioxane. Forty ml. of water was added to the solution. The pH of the solution was adjusted to 4 with hydrochloric acid. The solution was evaporated to remove the dioxane. The resulting aqueous solution was extracted twice with an equal volume of ethyl acetate and the spent aqueous phase was discarded. The ethyl acetate extracts were combined and were concentrated to dryness. The dried residue was dissolved in warm ethyl ether. The ether solution was chilled overnight to allow antibiotic A28695A to crystallize. The crystals were recovered by filtration and dried. Yield: 4.5 g. M.P. 97°–99° C.

EXAMPLE 3

Preparation of Acid Form of Antibiotic A28695B

One hundred mg. of A28695B as the mixed sodium-potassium salt were dissolved in 25 ml. of dioxane. Twenty ml. of water were added to the resulting solution and the pH was adjusted to 4.0 with hydrochloric acid. The solution was concentrated *in vacuo* in order to remove the dioxane. The resulting aqueous solution was extracted with an equal volume of ethyl acetate and the spent aqueous phase was discarded. The ethyl acetate extract was concentrated to dryness. The dried residue was dissolved in a minimum quantity of warm ethyl ether. The ether solution was held in the cold in order to allow crystallization of A28695B. The crystals were recovered by filtration and dried. Yield: 87 mg. M.P. 122°–124° C.

EXAMPLE 4

Preparation of the sodium salt of A28695A

Two hundred milligrams of A28695A acid, prepared according to the procedure described by Example 2, was dissolved in 10 ml. acetone. To the solution was added with stirring 5 ml. of water and the pH of the solution was adjusted to pH 9.0 with 1N sodium hydroxide. The acetone was slowly evaporated by placing the solution under a stream of nitrogen. A precipitate formed which was recovered and then dissolved in a minimum quantity of diethyl ether. The solution was evaporated to a small volume and chilled at 5° C. overnight. The resulting crystals were filtered and dried to yield 33 gm. of A28695A sodium salt melting at about 159–160° C.

EXAMPLE 5

Preparation of A28695A ammonium salt

Two hundred milligrams of A28695A acid, prepared according to the procedure in Example 2, were dissolved in 10 ml. of acetone and 5 ml. of water were added to the solution. The pH of the solution was adjusted to pH 9.0 with concentrated ammonium hydroxide. The acetone was slowly evaporated by placing the solution under a stream of nitrogen. After the acetone had been evaporated from the solution, a non-crystalline precipitate formed. The suspension was extracted with an equal volume of diethyl ether and the resulting ether solution was concentrated to a small volume by placing the solution under a stream of nitrogen. The concentrated solution was allowed to sit at 5° C. overnight. A crystalline precipitate formed which was filtered and dried to yield 120 mg. melting at about 124–125° C.

EXAMPLE 6

Preparation of the sodium salt of A28695B

Two hundred milligrams of the acid form of A28695B, prepared according to the procedure described by Example 3, were dissolved in 10 ml. of acetone and 5 ml. of water were added slowly, with stirring, to the resulting solution. The pH of the solution was adjusted to pH 9.0 with 1N NaOH. The acetone was slowly evaporated by placing the solution under a stream of nitrogen. After the acetone had been evaporated from the solution a crystalline precipitate began to form. The suspension was allowed to stand at 5° C. overnight in order for the crystallization to be complete. The crystals were filtered and dried to yield 150 mg. of A28695 sodium salt melting at about 161–162° C.

EXAMPLE 7

Preparation of the ammonium salt of A28695B

Two hundred milligrams of A28695B free acid, prepared according to the procedure described by Example 3, was dissolved in 10 ml. of acetone and 5 ml. of water were added to the resulting solution slowly, with stirring. The pH of the solution was adjusted to pH 9.0 with concentrated ammonium hydroxide solution. The acetone was evaporated from the solution by placing the solution under a stream of nitrogen. A crystalline precipitate began to form after the acetone had evaporated from the solution. The suspension was allowed to stand at 5° C. to complete the crystallization. The crystals of the ammonium salt of A28695B were recovered by filtration and dried to yield 138 mg. melting at about 124–125° C.

We claim:

1. The antibiotic A28695A which is a white crystalline compound melting at 97 to 99° C.; has an approximate molecular weight of 834 as determined by mass spectrometry; has the approximate elemental composition of 63.31% carbon, 8.83% hydrogen, and 28.03% oxygen; which in the form of its sodium salt has one titratable group having a pKa value of 5.51 as determined by electrometric titration in 66% aqueous ethanol; which in the form of its mixed sodium-potassium salt is a white crystalline compound melting at 161–165° C.; which is insoluble in water, slightly soluble in methanol and is soluble in diethyl ether, ethyl acetate, acetone, chloroform and benzene; has a specific rotation $[\alpha]_D^{25}$ +14.07° (C=1, methanol); which as a solution in chloroform has the following distinguishable bands in its infrared absorption spectrum: 3.1–3.3, 3.4, 3.47, 6.24, 6.84, 7.00, 7.25, 7.37, 7.49, 7.68, 7.78, 8.1, 8.47, 8.61, 8.95, 9.11, 9.20, 9.42, 9.5, 9.80, 9.98, 10.24, 10.54, 10.87, 11.09, 11.5 and 11.66 microns; and which shows no significant absorption in the ultraviolet region of the spectrum.

2. The antibiotic A28695B which is a white crystalline compound melting at 122–124° C.; has an approximate molecular weight of 846 as determined by mass spectrometry; has the approximate elemental composition of 60.49% carbon, 9.15% hydrogen, and 31.32% oxygen; which in the form of its sodium salt has one titratable group having a pKa value of 5.9 as determined by electrometric titration in 66% aqueous ethanol; which in the form of its mixed sodium-potassium salt is a white crystalline compound melting at 170–172° C.; which salt is insoluble in water, slightly soluble in methanol, soluble in diethyl ether, ethyl acetate, acetone, chloroform and benzene; has a specific rotation $[\alpha]_D^{25}$ +10.1° (C=1, 95% aqueous ethanol); which as a solution in chloroform has the following distinguishable bands in its infrared spectrum: 3.0, 3.4, 3.47, 6.24, 6.85, 7.01, 7.26, 7.3, 7.68, 7.78, 8.1, 8.58, 8.82, 8.95, 9.11, 9.19, 9.45, 9.59, 9.82, 10.04, 10.28, 10.55, 11.10, 11.24 and 11.65 microns; and which has no significant absorption in the ultraviolet region of the spectrum.

3. The method of producing the antibiotic A28695A of claim 1 and the antibiotic A28695B of claim 2 which comprises cultivating *Streptomyces albus* NRRL 3883 in a nutrient culture medium containing assimilable sources of carbon, nitrogen and inorganic salts under submerged aerobic fermentation conditions until a substantial amount of antibiotics A28695A and A28695B are produced by said organism in said culture medium.

References Cited

Miller, The Pfizer Handbook of Microbial Metabolites, 1961, McGraw-Hill Book Co., Inc., New York, N.Y., pp. 573–575.

JEROME D. GOLDBERG, Primary Examiner

U.S. Cl. X.R.

424—122· 195—80